Figure 1:
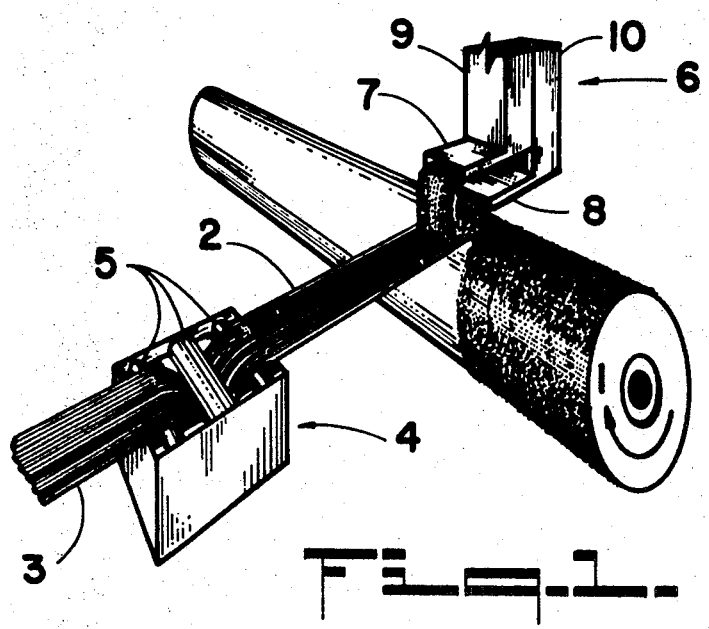

United States Patent

[11] 3,607,511

[72] Inventor James L. Grosh
 Los Altos, Calif.
[21] Appl. No. 842,075
[22] Filed June 25, 1969
 Division of Ser. No. 641,962, May 29, 1967, Pat. No. 3,470,917, Continuation-in-part of application Ser. No. 546,676, May 2, 1966, now Patent No. 3,483,896.
[45] Patented Sept. 21, 1971
[73] Assignee United Aircraft Corporation
 East Hartford, Conn.

[54] COMPOSITE REINFORCED PLASTIC PIPE
 4 Claims, 2 Drawing Figs.
[52] U.S. Cl. .................................................. 156/173,
 138/174
[51] Int. Cl. ...................................................... B65h 54/00

[50] Field of Search........................................... 138/141,
 145, 144, 127, 174; 156/173, 172, 171

[56] References Cited
 UNITED STATES PATENTS
| | | | |
|---|---|---|---|
| 1,504,805 | 8/1924 | Borsodi ...................... | 138/141 |
| 2,714,414 | 8/1955 | Ganahl et al................ | 156/171 |
| 2,742,931 | 4/1956 | Ganahl........................ | 138/144 |
| 3,340,115 | 9/1967 | Rubenstein.................. | 156/172 |

Primary Examiner—Carl D. Quarforth
Assistant Examiner—E. E. Lehmann
Attorney—Steven F. Stone ABSTRACT: A process for providing reinforced plastic pipe wherein particulate material is incorporated in the resin matrix between the layers of continuous filaments. The particulate material is applied in a bimodal manner with coarse particles being applied first and fine particles applied over the coarse particles to fill the spaces therebetween.

PATENTED SEP 21 1971 3,607,511

INVENTOR
JAMES L. GROSH

*Steven F. Stone*
ATTORNEY 3,607,511

COMPOSITE REINFORCED PLASTIC PIPE

BACKGROUND OF THE INVENTION

This application is a division of application Ser. No. 641,962 filed May 29, 1967, now U.S. Pat. No. 3,470,917, issued Oct. 7, 1969 and continuation in part of my copending coassigned U.S. Pat. application Ser. No. 546,676 filed May 2, 1966, now Pat. No. 3,483,896 for Composite Reinforced Plastic Pipe.

This invention relates to composite reinforced plastic pipes and more particularly to a composite reinforced plastic pipe capable of withstanding both internal and external pressure loads and methods for the fabrication of such pipe.

Reinforced plastic pipes are commonly formed by generating a cylinder from suitable filamentary material by continuously winding the filaments on a removable mandrel, the filaments being impregnated with a curable resinous material either before application to the mandrel or upon application to the mandrel, followed by curing of the structure and removal of the mandrel. By appropriate selection of the filamentary material and the binder, typically glass filaments and an epoxy or polyester resin, strong, corrosion-resistant structures can be fabricated.

Due to the high strength of the fiberglass filaments, such a structure is capable of withstanding substantial internal pressure loads. In most applications for large diameter pipes, such as in underground lines, however, the wall thickness is dictated by the external pressure and the nonuniform "D" loads (See ASTM C-76-63 T) produced by the ground loading rather than the internal pressure thus requiring structures having walls substantially thicker than would be necessary to withstand internal pressures normally encountered. Since the cost of the raw materials needed for a reinforced plastic pipe capable of withstanding a given external pressure load is substantially greater than the cost of competing materials such as reinforced concrete or steel, the latter materials are generally used in large diameter pipe applications even though the reinforced plastic pipe has generally superior physical and chemical properties.

In order to overcome this difficulty, it has been proposed to form large diameter reinforced plastic pipe in the form of sandwich structures. Such a structure consists of a thin layer of fiberglass reinforced plastic capable of withstanding the internal pressure loading surrounded by a thick mass of a core material capable of withstanding the compressive load and "D" loads such as concrete, for example, over which is wrapped a thin layer of reinforced plastic. When such cylindrical structures are subject to external loads, however, the deformation of the circular cross section is resisted by shear loads at the interfaces between the core material and reinforced plastic and failure of the structure occurs at the bond between these materials.

According to this invention, however, an inexpensive composite reinforced plastic pipe is provided that is capable of withstanding substantial external pressure loads and "D" loads without failure.

SUMMARY OF THE INVENTION

Broadly, this invention contemplates a composite reinforced plastic pipe comprised of a plurality of layers of high-strength filamentary material, successive layers each being separated by a layer of a particulate material, the entire structure being bonded together by a cured resinous binder. The relative thickness of the filamentary layer and the particulate layer should be carefully adjusted since too thin a particulate layer will require excessive amounts of fiberglass in the finished pipe and too thick a layer will create internal shear stresses which will cause cracks at the interfaces between the filaments and the particles upon deformation of the pipe. It has been found that the ratio of thickness of the particulate layer to the filamentary layer, $T_p/T_f$, should be within the range of from 2–50 and preferably at about 6.

It should be noted that the ratio of the $T_p/T_f$ need not be constant across the wall of the pipe. Since the shear stresses are not uniformly distributed across the wall, it is possible to maximize the properties of the pipe by employing low $T_p/T_f$ values in the regions of stress concentration and higher values of $T_p/T_f$ in low-stress areas.

For example, the shear stresses produced by the "D" loads concentrate within the wall adjacent to the internal and external surfaces thereof. The $T_p/T_f$ value in these regions can be selected in the lower portion of the range whereas in the central portion of the wall where there is little shear stress, the $T_p/T_f$ value can be selected in the upper portion of the range.

It is desirable to have a high solids loading in the particulate layers to increase the resistance to "D" loads and also to have accurate control of the particle layer thickness. According to this invention, the particulate material is applied in a bimodal manner, with large particles being applied first to establish the layer thickness and small particles applied over and between the large particles to increase the solids loading.

Preferably the pipe would be designed such that the structure, after curing of the resinous binder, contains sufficient filamentary material to withstand the internal pressure loads and sufficient particulate material between the filamentary layers to withstand the compressive and "D" loads. However, due to the above limitations on the relative thickness of the respective layers, in some applications when extremely high external loading pressures are encountered, it may be necessary to incorporate amounts of filamentary material in excess of that required to withstand the internal pressures.

Due to the high strength, chemical and physical properties and commercial availability, fiberglass is the preferred filamentary material. However, other high-strength filaments such as metallic wires or filaments and other materials such as filamentary silica could be employed. The filaments may be in the form of continuous filaments or a continuous fabric such as woven fiberglas cloth or as a fiber formed of braided filaments.

The preferred particulate material is sand. However, many other materials may be used such as particulate silica, small hollow spheres of various materials and carbon and graphite. If, for example, a lightweight conduit is desired, vermiculite or small hollow spheres of various materials such as glass or phenolic resin would be preferred materials.

Any of the binder systems used in the preparation of reinforced plastic structures may be used in the invention, epoxy and polyester systems being particularly desirable.

It is an object of this invention to provide a composite reinforced plastic pipe capable of withstanding internal and external pressure loads.

It is another object of this invention to provide a method for fabricating composite reinforced plastic pipe.

It is another object of the invention to provide a method for incorporating high solids loading of particulate material in a reinforced plastic pipe with control of the particulate layer thickness.

Figure 2:
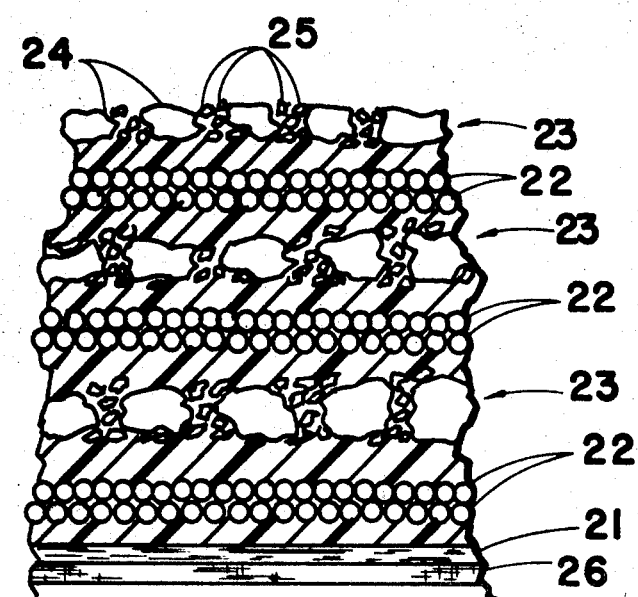

These and other objects of this invention will be readily apparent from the following description with reference to the accompanying drawings wherein:

FIG. 1 is a schematic representation of the fabrication of pipe according to this invention and FIG. 2 is an enlarged sectional view through the wall of a pipe according to this invention.

DESCRIPTION OF THE INVENTION

Referring now to FIG. 1, a schematic representation of a system for fabricating pipe according to this invention is shown. Since the apparatus forms no part of this invention, only the elements necessary for an understanding of this invention are shown, a complete description of a suitable machine appearing in U.S. Pat. No. 3,228,616.

A mandrel adapted for rotation as shown by the arrow has a band 2 of filaments 3 wet with resin by passage through resin pot 4 and across wiping rollers 5 continuously applied thereto. The filaments are continuously wrapped around the mandrel along the length thereof by causing relative reciprocal longitudinal motion between the mandrel and the band while the mandrel is rotating. The pitch or winding angle can be controlled, as is known in the art, by appropriate selection of the speed of rotation of the mandrel and the speed of longitudinal motion. The filament band 2 is preferably applied at a very high winding angle so that the continuous annularly disposed filaments are essentially hoop windings.

A hopper assembly 6 is provided which is maintained over mandrel 1 at the location where band 2 contacts mandrel 1. Hopper assembly 6 comprises two separate discharge portions 7 and 8 each of which have a separate feed portion 9 and 10. Discharge portion 7 is located in front of discharge portion 8 such that particles fed from discharge 7 will be applied to the band 2 first and as the mandrel rotates particles from discharge 8 will be applied over the particles from discharge 7. Sufficient resin is contained on band 2 to cause the particles applied to adhere thereto. Particles in supply portion 9 are of larger size than in supply portion 10 so that larger-sized particles are applied first with the smaller-sized particles being applied over the larger particles and in the spaces therebetween.

This process is continued for a number of passes sufficient to build up the desired wall thickness after which the resin is cured and the mandrel removed. By this technique greater uniformity in the thickness of the sand layers and a higher solid loadings are obtained than where particles of random size or of just one size are employed. When random size particles are employed the thickness of the sand layer is irregular. When single-sized particles are employed the thickness can be controlled but the solids loading is relatively low. By the instant technique the larger particles are applied to the band first, establishing a uniform layer thickness, and the smaller particles then are applied and sift between the larger particles to increase the solids loading without increasing the thickness of the particle layers.

The particle sizes can be selected within fairly wide limits with the following sizes being representative rather than limiting. A large particle in the range of from 8 to 64 mesh and small particles size in the range of 100 mesh to 5 micron have been found to produce pipe having the desired characteristics.

Referring now to FIG. 2 a cross section through the wall of a pipe manufactured according to this invention is shown. The inner layer 20 is a gel coat containing veil cloth 26 which was initially applied around the resin-coated mandrel. To provide longitudinal reinforcement a layer of longitudinally extending filaments 21 have been applied over the veil cloth as is described in my copending, coassigned patent application for Transverse Filament Reinforcing Tape and Method and Apparatus for the Production Thereof of like date herewith. Layers of annularly disposed filaments 22 are separated by particle layers 23 each composed of large particles 24 and smaller particles 25 with the thickness of the particle layers being determined substantially by the larger particles 24. The entire structure is held together by the cured resinous matrix.

EXAMPLE 1

A 24-inch ID and 24¾-inch OD pipe was manufactured according to this invention employing fiberglass filaments and sand having 16 mesh 200 mesh average size. The fiberglass layers were about 0.005-inch thick and the particle layers about 0.05-inch thick. The finished pipe consisted of about 35 percent resin, 15 percent glass and 50 percent sand with about 10 percent by weight of sand being in the form of fine particles.

While this invention has been described with respect to specific examples thereof it should not be construed as limited thereto. Various modifications and substitutions will be obvious to workers in the art and can be made without departing from the scope of this invention which is limited only by the following claims.

I claim:
1. In a method for manufacturing reinforced plastic pipe which comprises the steps of:
   a. winding filamentary material wet with an uncured resin around and along a rotating mandrel,
   b. dropping a particulate material stream onto said resin wet filamentary material whereby individual particles of said particulate material are retained on said filamentary material during rotation of said mandrel by contact with said uncured resin, and
   c. winding filamentary material wet with an uncured resin around and along said rotating mandrel and over said particulate material whereby a curable, resin-impregnated wall structure of layers of filamentary material separated one from another by a layer of particulate material is built up;

the improvement, whereby the uniformity of thickness and the solids loading of said layer of particulate material are enhanced, said improvement comprising the steps of:
   i. providing first and second discrete sources of said particulate material, a substantial portion of the particles contained in said first source being larger in size than in substantial portion of the particles contained in said second source,
   ii. dropping a stream of particles from said first discrete source onto said resin wet filamentary material, and
   iii. dropping a stream of particles from said second discrete source onto said resin wet filamentary material and over the particles from said first discrete source.

2. The method of claim 1 wherein said filamentary material is glass and said particulate material is sand.

3. The method of claim 1 wherein substantially all of the particles contained in said first discrete source have a size in the range from 8 mesh to 64 mesh and substantially all of the particles contained in said second group have a size in the range of from 100 mesh to 5 micron.

4. The method of claim 2 wherein substantially all of the particles contained in said first discrete source have a size in the range from 8 mesh to 64 mesh and substantially all of the particles contained in said second group have a size in the range of from 100 mesh to 5 micron.